2,957,003
IMIDAZOLINES AND IMIDAZOLINIUM SALTS

Carl E. Johnson, Glen Ellyn, Ill., assignor to Nalco Chemical Company, a corporation of Delaware No Drawing. Filed Sept. 2, 1958, Ser. No. 758,577
9 Claims. (Cl. 260—309.6)

This invention relates to imidazolines and imidazolinium salts having the formulas:

FORMULA I

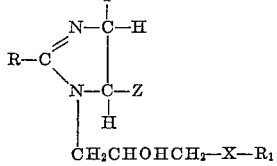

and

FORMULA II

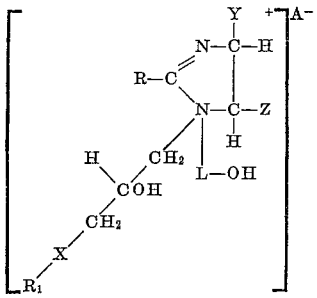

In Formulas I and II, R is an aliphatic group of from 5 to 21 carbon atoms in chain length; Y and Z may be hydrogen or lower aliphatic hydrocarbon groups of not more than 6 carbon atoms in chain length; $R_1$ is a radical which may be alkyl, alkaryl, or carbocyclic and does not contain more than 24 carbon atoms; X is either sulfur or oxygen; D is a divalent acyclic, organic radical containing elements selected from the group consisting of C, H, and O and contains less than 25 carbon atoms, and A represents a salt-forming group, e.g., a halogen, preferably chlorine, iodine, or bromine.

Specific compositions of the invention are the imidazolinium chlorides represented by Formulas III and IV below:

FORMULA III

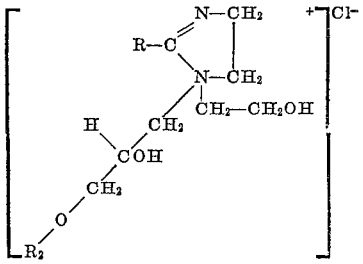

FORMULA IV

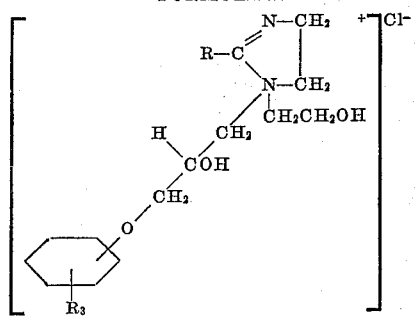

In these formulas, R has the same significance as shown in Formulas I and II. $R_2$ in Formula III is an alkyl group of from 6 to 18 carbon atoms in chain length. In Formula IV, $R_3$ is an alkyl group of from 1 to 18 carbon atoms in chain length.

These new chemicals are prepared by reacting certain type imidazolines with alkylating agents formed by reacting alcohols, thiols, phenols, or thiophenols with an epihalohydrin such as epichlorohydrin or epibromohydrin. This reaction when properly conducted, produces materials having the formula:

FORMULA V

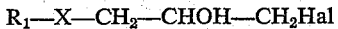

$$R_1\text{—}X\text{—}CH_2\text{—}CHOH\text{—}CH_2Hal$$

where $R_1$ is a radical of the type described in Formula I, Hal represents halide, preferably chloride or bromide, and X is sulfur or oxygen.

The starting alcohols or phenols may be selected from a large group of compounds. Thus, such alcohols as methanol, ethanol, isopropanol, 2-ethylhexanol, octyl alcohol, decyl alcohol, dodecyl alcohol, tetradecyl alcohol, and hexadecyl alcohol may be used when it is desirabe to place a straight or branched chain configuration into the terminal portion of the molecule. When aliphatic alcohols are used, the most useful compounds are produced when the chain lengths range from 8 to 18 carbon atoms.

In addition to the aliphatic alcohols, the carbocyclic alcohols such as cyclohexanol or alcohols derived from rosin acids, such as abietyl alcohols may also be used.

Preferred starting alcohols are the well-known mixed oxo-heavy fraction alcohols. These oxo-alcohols are produced by the hydrogenation of aldehydes produced by the reaction of olefins, carbon monoxide and hydrogen in the presence of catalysts at elevated temperatures and pressure. A typical heavy-oxo-fraction alcohol has the following composition: octyl alcohol, 10% by weight; nonyl alcohol, 20% by weight; and decyl and higher alcohols, 70% by weight. As supplied in their crude form, the alcohols are admixed with various amounts of esters and soaps, but these materials do not enter into the reaction, and hence, are not considered to be important.

Thiols such as hexyl and dodecyl mercaptan may be used to prepare the compositions of the invention where a sulfur-containing molecule is desired.

While any phenol may be used as a starting ingredient, it is desirable to use para-alkyl substituted phenols which contain as the alkyl substituent a branched or straight chain hydrocarbon radical containing from 6 to 18 carbon atoms in chain length. Exemplary of starting phenolic materials are the compounds, phenol, o, m, p-cresol, p- nonylphenol, p-dodecylphenol, and p-octadecylphenol. The thiophenols corresponding to the phenols listed above may also be used.

The imidazolines used to prepare the compositions are of two types which are illustrated by Formulas VI and VII.

FORMULA VI

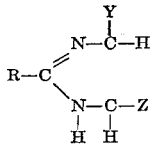

FORMULA VII

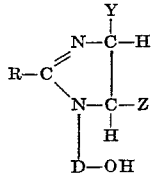

In the above formulas, the substituents R, Y, Z, and D are described and identified in the discussion of Formulas I and II. These starting materials are conveniently prepared by reacting an appropriate mono carboxylic acid with ethylene diamine or a substituted ethylene diamine. Useful imidazolinium halides are prepared by reacting the imidazolines of the Formula VII type with the reagents shown in Formula V.

The starting imidazolines are also prepared by using as the amine reactant an alkanol substituted ethylene diamine such as, for instance, aminoethyl ethanol amine.

When it is desirable to produce a plurality of alkoxy substituents on the 1-nitrogen of the heterocyclic ring, an imidazoline of the Formula VI type may be reacted with varying quantities of alkylene oxide, such as ethylene oxide, 1,2-propylene oxide, 1,3-propylene oxide, or 1,2-butylene oxide. This type of product is generically shown in Formula VII where the divalent radical D represents such radicals as ethylene, propylene, and an oxyalkylene group of the formula $-(C_nH_{2n}O-)_xC_nH_{2n}-$ wherein $n$ is 2–4 and $x$ is a number sufficiently low that the total number of carbons in the group D is less than 25.

The mono carboxylic acids used to prepare the starting imidazolines contain at least 6 carbon atoms in chain length and should not exceed 22 carbon atoms in chain length. Thus, such acids as hexanoic, decanoic, dodecanoic, octanoic, hexadecanoic, 12-hydroxy octadecanoic and the like may be used.

Valuable commercial products are afforded when the starting imidazolines are prepared from mixtures of acids of the type commonly associated with vegetable oils and animal fats. Thus, coconut fatty acids, palm oil fatty acids, tall oil acids, tallow fatty acids as well as hydrogenated fatty acids may be employed without departing from the scope of the invention. When the mixed acids are used, the alkyl substituent in the 2-position of the heterocyclic ring will contain mixed alkyl groups which correspond to the starting mixed fatty acids employed. Since the nomenclature of these mixed 2-alkyl substituted imidazolines is relatively complex, the mixed substituents will be conveniently referred to in terms of the starting acid even though the carboxylic carbon atoms become a part of the heterocyclic ring. For a more complete description of the starting imidazolines and their method of preparation, reference should be made to Wilson U.S. Patents 2,267,965 and 2,355,837.

For purposes of illustration, the following typical starting imidazolines are set forth below in Table I.

Table I

I. 1-(2-hydroxyethyl)-2-coco-imidazoline.
II. 1-(2-hydroxyethyl)-2-distilled tall oil imidazoline.
III. 1-(2-hydroxyethyl)-2-heptadecenyl imidazoline.
IV. 1-(2-hydroxyethyl)-2-hydrogenated tallow imidazoline.
V. 1-(3-hydroxy propyl)-2-hexyl imidazoline.
VI. 2-heptadecyl imidazoline.
VII. 2-heptadecyl-3,4-dimethyl imidazoline.
VIII. 1-([octa ethoxy] ethanol)-2-heptadecyl imidazoline.[1]

[1] 2-heptadecyl imidazoline reacted with 9 moles of ethylene oxide.

The reactions to produce the compounds of the invention are preferably conducted in two stages. The first comprises reacting the alcohol (or thiol) or phenol (or thiophenol) with the epihalohydrin. The second stage consists in the amination of the resultant product with the imidazoline.

To facilitate conducting the reactions, a Friedel-Crafts catalyst, such as stannic chloride or aluminum chloride may be used in the first stage. The reaction is usually exothermic and once started, should be controlled so as not to decompose the starting ingredients. The amination reaction is usually conducted at elevated temperatures above 100° C. and preferably at about 150–200° C. for periods of time ranging from one to five hours.

The following procedures were used to prepare several illustrative compounds of the invention:

PROCEDURES

In the reaction of an alcohol or thiol with epihalohydrin the following procedure was used.

Stoichiometric amounts of the alcohol and epihalohydrin were placed in the flask, the apparatus was assembled, and the reactants were mixed. If necessary, heat was applied to form the solution. Anhydrous stannic chloride was added. For 100 g. of reactants, 0.5 g. of stannic chloride was added. An exothermic reaction began. The temperature rose rapidly until reaction ended. For octyl alcohol, the maximum temperature was about 165° C.; for decyl alcohol, it was about 150° C.; for dodecyl alcohol, it was about 140° C.; for tridecyl alcohol and heavy oxo bottoms, it was about 135° C.; for tetradecyl alcohol, it was about 130° C.; for hexadecyl alcohol, it was about 120° C. The temperature was allowed to fall slowly to room temperature.

In the reaction of a phenol or thiophenol and epihalohydrin, the following procedure was used. Stoichiometric amounts of the phenol and epihalohydrin were placed in the flask, the apparatus assembled, and the reactants were mixed. Anhydrous stannic chloride was added. For every 100 g. of reactants, 0.5 g. of stannic chloride was added. The temperature was raised slowly by heating to 150° C. where it was maintained for one hour. The temperature was allowed to fall slowly to room temperature.

In the reaction of the (alcohol or thio)- or (phenol or thiophenol)-epihalohydrin compound and imidazoline, the following procedure was used. Stoichiometric amounts of the first stage compound and the amine were placed in the flask, the apparatus was assembled, and the reactants were mixed. The temperature was raised slowly by heating to 150° C. where it was maintained for one hour. The temperature was allowed to fall slowly to room temperature.

The compounds synthesized using the above preparative techniques are listed below in Tables II and III. Table II lists the compounds where an alcohol or thiol was used as the starting ingredient. Table III shows compounds prepared from either phenols or thiophenols.

Table II

| Comp. No. | Alcohol/Thiol | Epihalohydrin | Imidazoline, Table I |
|---|---|---|---|
| IX | octyl alcohol | epichlorohydrin | I |
| X | n-decyl alcohol | ---do--- | I |
| XI | nonyl alcohol | epibromohydrin | IV |
| XII | dodecyl alcohol | epichlorohydrin | I |
| XIII | heavy oxo fraction | ---do--- | V |
| XIV | tetradecyl alcohol | ---do--- | II |
| XV | octyl mercaptan | ---do--- | III |
| XVI | heavy oxo bottoms | ---do--- | I |
| XVII | cyclohexanol | epibromohydrin | VI |

Table III

| Comp. No. | Phenol/Thiophenol | Epihalohydrin | Imidazoline, Table I |
|---|---|---|---|
| XVIII | p-iso-octyl phenol | epichlorohydrin | I |
| XIX | p-nonyl phenol | ---do--- | III |
| XX | m-cresol | ---do--- | V |
| XXI | p-n-dodecyl phenol | ---do--- | II |
| XXII | p-octyl thiophenol | ---do--- | VIII |
| XXIII | p-nonyl phenol | ---do--- | VI |
| XXIV | p-octadecyl phenol | ---do--- | I |

The compositions of the type shown vary in physical appearance from clear, water-white, nonviscous liquids to heavy light tan to dark brown waxes. When imidazolines unsubstituted in the 1-position are used, the hydrohalide is formed. This salt is readily neutralized to form the free imidazoline by using an appropriate base such as an alkali metal hydroxide, e.g., NaOH or KOH. The compounds of Formula I are also converted to their salts by the usual salt-forming reactions whereby acids, for example, sulfuric, nitric, acetic and/or other acids are added to introduce the salt-forming group into the compound.

The compounds of the invention have many useful and valuable applications and may be considered as intermediates, wetting agents, emulsifying agents, corrosion inhibitors, bactericides, fungicides, asphalt additives, pigment dispersants in paints, rodent repellents, cationic additives and textile antistatic agents.

In the several structural formulas appearing in the specification, the alkylation of the imidazoline is shown to have occurred on the 1-nitrogen atom. If it occurs on the 3-nitrogen atom, then such is contemplated as being within the scope of this invention.

The invention is hereby claimed as follows:

1. A new composition of matter consisting of a compound selected from a group consisting of compounds of the formulae:

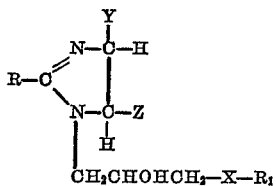

and

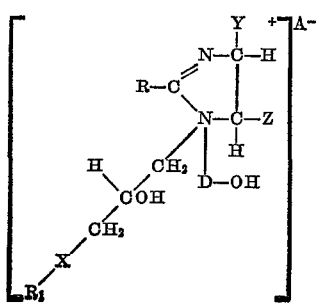

where R is an aliphatic non-acetylenic hydrocarbon group of from 5 to 21 carbon atoms in chain length, Y and Z are selected from the group consisting of hydrogen and lower aliphatic non-acetylenic hydrocarbon groups of not more than 6 carbon atoms in chain length, $R_1$ is selected from the group consisting of alkyl, phenyl, alkyl phenyl, cyclohexyl and abietyl hydrocarbon groups, the groups constituting $R_1$ containing not more than 24 carbon atoms, X is selected from the group consisting of sulfur and oxygen, D is a divalent acyclic organic group selected from the group consisting of ethylene, propylene and an oxyalkylene group of the formula $$-(C_nH_{2n}O-)_xC_nH_{2n}-$$

wherein $n$ is 2–4 and $x$ is a number sufficiently low that the total number of carbons in the group D is less than 25 carbon atoms, and A represents halide.

2. An imidazolinium chloride having the formula:

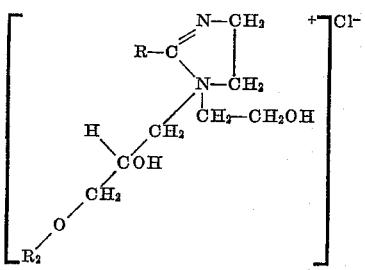

where R is an aliphatic hydrocarbon group of from 5 to 21 carbon atoms in chain length and $R_2$ is the residue of a mixed oxo fraction alcohol containing about 10% by weight of octyl alcohol, about 20% by weight of nonyl alcohol and about 70% by weight of decyl and higher alcohols.

3. The imidazolinium chloride of claim 2 where $R_2$ is n-decyl.

4. The imidazolinium chloride of claim 2 where $R_2$ is tridecyl.

5. The imidazolinium chloride of claim 2 where $R_2$ is dodecyl.

6. An imidazolinium chloride having the formula:

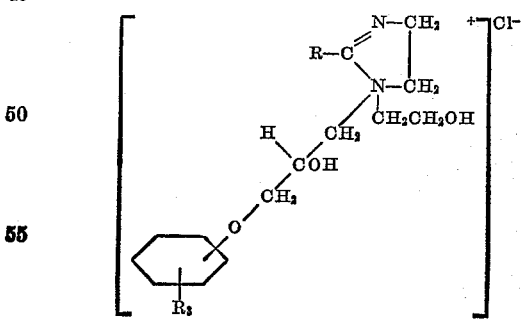

where R is an aliphatic hydrocarbon group of from 5 to 21 carbon atoms in chain length and $R_3$ is an alkyl group of from 1 to 18 carbon atoms in chain length.

7. The imidazolinium chloride of claim 6 where $R_3$ is p-iso-octyl.

8. The imidazolinium chloride of claim 6 where $R_3$ is p-nonyl.

9. The imidazolinium chloride of claim 6 where $R_3$ is p-n-dodecyl.

References Cited in the file of this patent

UNITED STATES PATENTS 2,781,358  Mannheimer  Feb. 12, 1957

UNITED STATES PATENT OFFICE
CERTIFICATION OF CORRECTION

Patent No. 2,957,003                 October 18, 1960

Carl E. Johnson

It is hereby certified that error appears in the above numbered patent requiring correction and that the said Letters Patent should read as corrected below.

Column 1, line 35, Formula II, for that portion reading "L—OH" read -- D—OH --; column 5, line 26, for "water-whtite" read -- water-white --.

Signed and sealed this 23rd day of May 1961.

(SEAL)
Attest:

ERNEST W. SWIDER                                        DAVID L. LADD
Attesting Officer                                             Commissioner of Patents